(12) United States Patent
Dunkelberg

(10) Patent No.: US 11,622,647 B2
(45) Date of Patent: Apr. 11, 2023

(54) METHOD AND APPARATUS FOR CONTROLLING A COFFEE GRINDER

(71) Applicant: Hemro International AG, Bachenbülach (CH)

(72) Inventor: Oliver Dunkelberg, Willerzell (CH)

(73) Assignee: Hemro International AG, Bachenbülach (CH)

( * ) Notice: Subject to any disclaimer, the term of this patent is extended or adjusted under 35 U.S.C. 154(b) by 705 days.

(21) Appl. No.: 16/700,030

(22) Filed: Dec. 2, 2019

(65) Prior Publication Data

US 2020/0170444 A1    Jun. 4, 2020

(30) Foreign Application Priority Data

Dec. 4, 2018    (EP) ..................... 18210018

(51) Int. Cl.
*A47J 31/52*    (2006.01)
*A47J 42/44*    (2006.01)
*A47J 31/46*    (2006.01)
*A47J 31/42*    (2006.01)
*A23F 5/08*    (2006.01)
*A23F 5/26*    (2006.01)

(52) U.S. Cl.
CPC ............ *A47J 31/5255* (2018.08); *A23F 5/08* (2013.01); *A23F 5/262* (2013.01); *A47J 31/42* (2013.01); *A47J 31/465* (2013.01); *A47J 31/468* (2018.08); *A47J 42/44* (2013.01)

(58) Field of Classification Search
CPC .. A47J 311/42; A47J 311/465; A47J 311/468; A47J 311/5255; A47J 42/44; A23F 5/08; A23F 5/262
See application file for complete search history.

(56) References Cited

U.S. PATENT DOCUMENTS 4,767,632 A    8/1988 Meier
10,478,011 B2 *    11/2019 Truninger ............. A47J 31/469
(Continued)

FOREIGN PATENT DOCUMENTS

DE    31 07 549 A1    2/1982
EP    2 314 188 A1    4/2011
(Continued)

OTHER PUBLICATIONS

English Translation for ES2525965 published Dec. 2015.*
European Search Report 18 21 0018.0 dated Mar. 15, 2019.
European Written Opinion 18 21 0018.0 dated Mar. 15, 2019.

*Primary Examiner* — Anthony J Weier
(74) *Attorney, Agent, or Firm* — Sughrue Mion, PLLC

(57) ABSTRACT

A method for controlling an automatic coffee bean grinder (2) which is separate from an automatic coffee brewing machine (1) using ground coffee produced by said coffee bean grinder (2), is shown, wherein a flowmeter sniffer element (15) is located in or at a housing (3) of said coffee brewing machine (1) is capturing the water flow-through information measured by a water flowmeter (5) of said coffee brewing machine (1), and transmits the water flow-through information to a grinder control unit (26) located in the automatic coffee bean grinder (2), and the grinder control unit (26) controls the grinder module (24) as a function of the water flow-through information transmitted from said flowmeter sniffer element (15).

25 Claims, 1 Drawing Sheet

(56) References Cited

U.S. PATENT DOCUMENTS

| | | | | |
|---|---|---|---|---|
| 2008/0190297 A1* | 8/2008 | Gussmann | ............ | A47J 31/404 426/507 |
| 2010/0198413 A1* | 8/2010 | De' Longhi | ............ | A47J 31/42 700/275 |
| 2018/0055288 A1* | 3/2018 | Rose | .................. | G01N 33/0001 |
| 2018/0206668 A1* | 7/2018 | Sahli | ....................... | A47J 31/52 |
| 2018/0325303 A1 | 11/2018 | Leung et al. | | |

FOREIGN PATENT DOCUMENTS

| | | | |
|---|---|---|---|
| EP | 3 162 256 A1 | | 5/2017 |
| ES | 2525965 | * | 12/2015 |
| GB | 2448891 | * | 6/2008 |
| WO | 2009/010190 A1 | | 1/2009 |
| WO | 2009/127952 A1 | | 10/2009 |
| WO | 2014/207281 A1 | | 12/2014 |

* cited by examiner

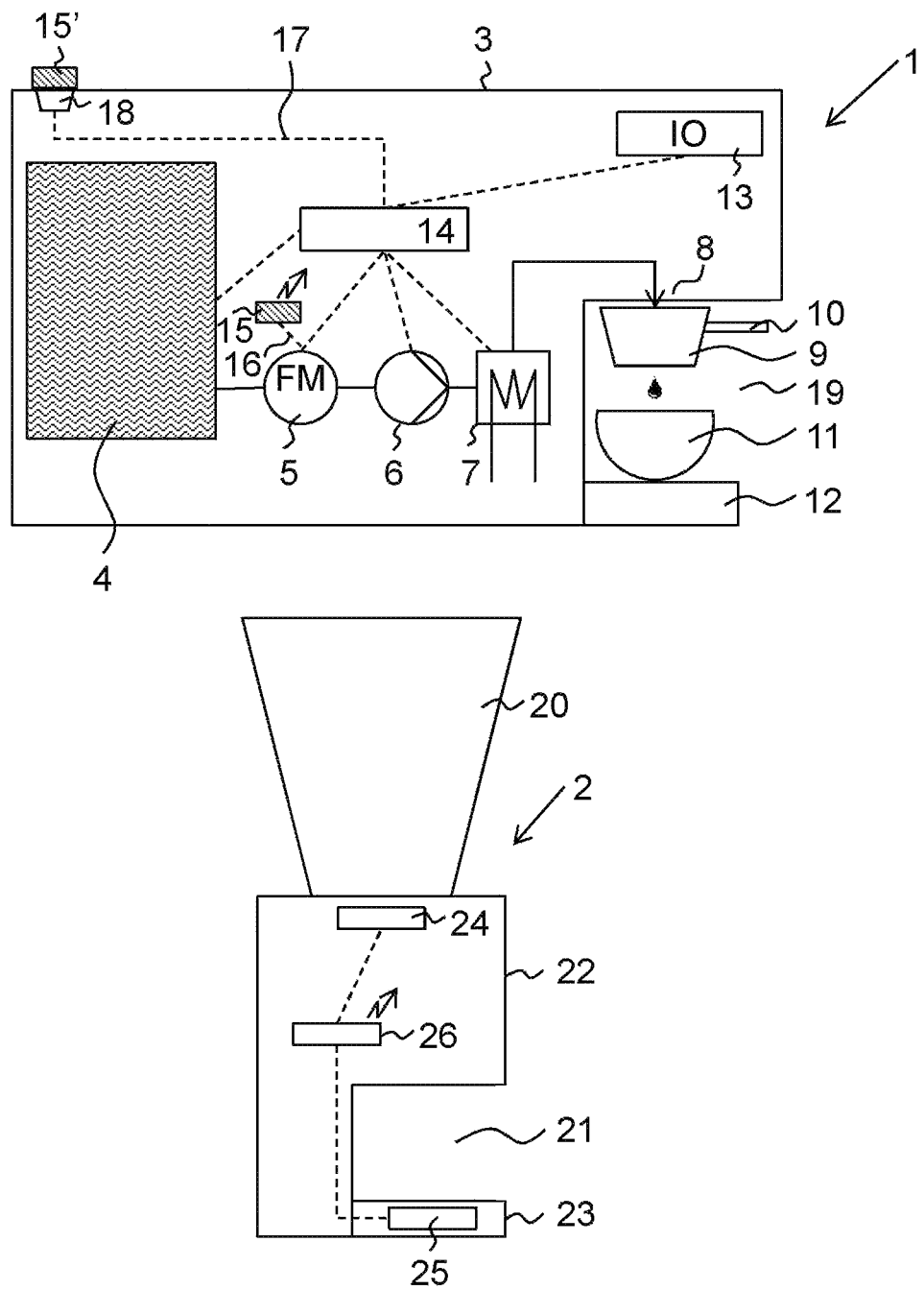

METHOD AND APPARATUS FOR CONTROLLING A COFFEE GRINDER

TECHNICAL FIELD

The present invention relates to a method for controlling a coffee grinder as well as to a method for upgrading an ensemble of a coffee grinder and a separate coffee brewing machine. Furthermore it relates to devices in relation with such applications.

PRIOR ART

The coffee brewing process starting out from coffee beans involves the steps of grinding the coffee beans and subsequently extracting the coffee from the ground coffee beans by feeding a preset amount of hot water into a corresponding brewing chamber.

There are different ways to structure this process, there are combined fully automatic machines, which need to be supplied with water and coffee beans, and in which the coffee is ground, automatically transported to the brewing chamber, and then automatically a preset amount of hot water is introduced into that chamber and the outflow in coffee is collected in a cup. The control in these machines is a delicate matter, since the aim is to provide an as reliable and constant quality of coffee as possible, including additional features such as providing the right amount of foam on top of the coffee, being able to distinguish between espresso and other types of coffee, et cetera. Machines of this fully integrated type and corresponding controls are known e.g. from U.S. Pat. No. 4,767,632 or DE 3107549.

These combined fully automatic machines are hardly used in commercial high-end coffee brewing environments. In these environments there are always separate coffee brewing machines and coffee bean grinders. The reasons are manifold, the so-called baristas want to have freedom to adapt parameters as concerns the grinding process and as concerns the brewing process, good grinding machines need a different environment, different materials, different manufacturing focuses, and different electronics than good coffee brewing machines, and having these two key elements in one single machine reduces flexibility as concerns replacement in case of damage et cetera.

There are like two different markets for these high-end machines, one market for the coffee brewing machines and one market for the coffee bean grinder machines. The coffee brewing machines are highly surface that highly controlled machines having a variety of sensors and control mechanisms to make sure that water of the appropriate pressure and temperature, if need be according to a corresponding pressure and temperature profile, is supplied to the brewing chamber, typically in this field in the form of a porta filter. The porta filter (also sometimes spelled porta-filter or portafilter) is the component of the espresso maker that holds the ground espresso beans (coffee grounds) before and during the brewing process. It is including a handle, which allows the person who is brewing the espresso to hold the portafilter unit, on the one hand for inserting it in a corresponding opening of the coffee bean grinding machine and to fill it with ground coffee, and on the other hand to transfer it to the coffee brewing machine, attaching it to it, typically using a bayonet mechanism, and after the brewing process to remove it again and empty it tipping it over. Another part of the portafilter is the filter basket, which fits inside the exterior of the portafilter. It is normally made of metal and has small holes which act as a screen and allow the extracted espresso to run through, down towards the bottom and out a hole or chute into the cup sitting below.

SUMMARY OF THE INVENTION

Coordination between the coffee bean grinder machine and the separate coffee brewing machine operation is carried out by the barista. However there is not always such an experienced person available, and there is therefore a need for coordinating the operation of these two separate elements. Is therefore an object of the present invention to allow for coordination of the operation of a coffee bean grinder machine and a separate coffee brewing machine in a simple as possible but at the same time as effective and reliable manner as possible and without interfering too much with the devices. In particular, in view of the fact that typically the coffee brewing machines are equipped with their own controls and operation schemes, which shall not be influenced but also should not have to be adapted to implement a corresponding control, the aim is to provide a method for controlling the coffee bean grinder to adapt optimally to the corresponding operation of a coffee brewing machine.

According to a first aspect of the present invention there is therefore proposed a method for controlling an automatic coffee bean grinder which is separate from an automatic coffee brewing machine, and which automatic coffee brewing machine, which does not itself comprise a coffee bean grinder and is located in a separate housing from the housing of the coffee bean grinder, is using ground coffee produced by said coffee bean grinder.

According to the present invention, a flowmeter sniffer element is located in or at a housing of said coffee brewing machine and is capturing the water flow-through information measured by a water flowmeter of said coffee brewing machine. The flowmeter then transmits the water flow-through information to a grinder control unit located in the automatic coffee bean grinder, and the grinder control unit controls the grinder module as a function of the water flow-through information transmitted from said flowmeter sniffer element.

According to this invention the control of the automatic coffee brewing machine is not controlling the grinding process in the coffee bean grinder and/or the automatic coffee brewing machine is a separate machine from the coffee bean grinder machine in a separate housing and with separate control and preferably no direct data exchange between the control units of the two machines.

Using that approach by simply so to speak parasitically putting a flowmeter sniffer into the coffee brewing machine the grinder can be controlled most efficiently. As a matter of fact, the water flow characteristics are essential for the reliability and the constant quality of the final coffee. Therefore measuring the flow of the water in the coffee brewing machine is the optimum position to control the process also of the grinder. By using the proposed flowmeter sniffer one makes use of the sensors already available in the coffee brewing machine, without however changing anything else in the brewing machine, i.e. changing the brewing protocols et cetera. All that takes place is that the flowmeter sniffer detects the water flow in the coffee brewing machine and transmits it to the grinder. The grinder control then uses the corresponding information to adapt the grinding process. If for example the time it takes for the water to pass through the ground coffee in the coffee brewing machine, the grinder process can be adapted so as to for example lead to coarser ground coffee or two generate a smaller amount of coffee proportion to be put into a porta filter. The automatic grinder as envisaged in this application is not only able to grind the coffee, it also automatically adjusts the amount of coffee per portion and to be filled into a porta filter. It furthermore has means to adapt the grinding process, in particular to change the degree of grinding, by changing the speed of the grinder and/or the distance in the grinding slot.

Having the information from the flowmeter of the coffee machine the grinder can determine the brewing process parameters, e.g. used amount of water, the extraction time and also the flowrate profile for each shot.

According to a first preferred embodiment of the proposed invention, the flowmeter sniffer element transmits the water flow-through information by way of wireless communication to the grinder control unit, preferably by way of one of the standards selected from: Bluetooth, BLE, ZigBee, Z-wave, 6LoWPAN, Thread, LoRaWAN, 2G, 3G, 4G, 5G, LTE, NFC. Using a wireless communication protocol further simplifies the process enormously. To establish a corresponding control one can simply remove the required part of the housing in the coffee brewing machine, attach the flowmeter sniffer to the flowmeter of the coffee brewing machine, if need be attach the flowmeter sniffer parasitically also to the power supply of the coffee brewing machine, or have it powered by a battery, and then close the coffee brewing machine housing again. No further alteration is required, and the coffee brewing machine can operate as usual. All that then takes place is that the grinder gets information automatically about the water flow characteristics in the coffee brewing machine, and it can automatically adapt and optimize the coffee making process.

The water flow-through information is normally a train of impulses as a function of time, the occurrence and/or spacing of which impulses is a function of or allows the determination of the total brewing time, the flow speed as a function of time, or a combination thereof, or is directly information on the total brewing time and/or total brewing water amount and/or water flow as a function of time. Flowmeters in conventional coffee brewing machines are typically turbine flowmeters where the rotation of the spinning wheel is detected by way of a magnetic element rotating with that spinning wheel, and a hall sensor on the housing detecting the passing of the corresponding magnet and sending out impulses each time a magnet passes the sensor. The resulting signal is a train of impulses as a function of time, which is characteristic of the flow-through the measurement device.

The flow meter in the present context can be a volumetric flow meter for coffee machines comprising: a hollow cylindrical structure, two tangential couplings for the connection of pipes conveying water respectively into and out of said hollow cylindrical structure; an impeller which can be associated with rotational support system, suitable to allow rotation thereof on a plane normal to a pin forming the rotation axis of the impeller; electronic means for detecting the revolutions of said impeller; wherein said pin is associated with the impeller. Said electronic means for detecting the revolutions of said impeller may comprise at least one fixed Hall effect sensor, which detects the passage of magnetic means associated with said impeller and emits electrical pulses. Said magnetic means may comprise two through magnets, i.e. installed on the impeller so as to pass there through parallel to its rotation axis. Possible is a flow meter according to WO-A-2009127952.

Preferably the impulses obtained by the flowmeter sniffer element from the flowmeter are time stamped in the flowmeter to eliminate the influence of transmission delays between the flowmeter sniffer and the grinder control unit, and then transmitted with the timestamp as water flow-through information to the grinder control unit.

The water flow-through information received by the grinder control unit from that flowmeter sniffer element can be used by the grinder control unit to adapt the grinder module operation in terms of grain size, grinding duration per portion, total weight of ground coffee per portion, or a combination thereof.

The coffee bean grinder may further comprise, according to another preferred embodiment, or be connected to a load cell which measures the effective weight of the ground coffee per portion, said load cell being in data communication with the grinder control unit, and wherein the method involves adapting controlling the grinder module to produce a predetermined effective weight of ground coffee proportion as a function of input obtained from said load cell as well as from the flowmeter sniffer element.

The coffee brewing machine typically comprises at least one water tank, at least one water pump to pump water from the water tank to an interface to a porta filter, at least one heater, preferably located downstream of said pump, to heat the water to a predetermined temperature and bring it up to the desired pressure, as well as at least one flowmeter, preferably located upstream of said pump to measure the water flow-through information of pumped water from the water tank, a brewer control unit controlling pump and/or heater as a function of said water flow-through information, as well as preferably at least one user interface to allow for user input, in particular brewing profile selection, and/or for user output, in particular status and operational information display.

The flowmeter sniffer element is normally a separate small size unit (typically not more than 1×1×1 cm) having connector elements to physically connect to the output lines or to intercept and/or sniff the data line between the flowmeter and a brewer control unit, a power supply element, preferably in the form of a battery or to be (e.g. parasitically) attached to the power supply of said coffee brewing machine, and a wireless transmission unit to wirelessly transmit water flow-through information read out from the flowmeter to the grinder control unit.

Said flowmeter sniffer element, preferably being part of the coffee bean grinder product package, can be inserted into the housing of the coffee brewing machine only upon installation of the coffee bean grinder for cooperation and control of the coffee bean grinder.

The coffee brewing machine can also be provided with an interface for a flowmeter sniffer element, e.g. in the form of a USB port, said interface being located at the outside of the housing or integrated in the housing of the coffee brewing machine and being provided by the brewer control unit with water flow-through information from the flowmeter, and said flowmeter sniffer element, preferably being part of the coffee bean grinder product package, can then be attached like a small dongle to said interface of the coffee brewing machine only upon installation of the coffee bean grinder for cooperation and control of the coffee bean grinder.

In case there are several coffee brewing machines cooperating with the same single coffee grinding machine it is possible to have several flowmeter sniffers in each of the coffee brewing machines (or in individual outlet ports of one large coffee brewing machine). It is then possible to either have the user input on the grinder machine for which machine or port the porta filter is intended, and then the coffee grinder can adapt depending on the flow information from the respective flowmeter sniffer. It is also possible to have an automatic detection (e.g. optically, rfid) on the grinder machine which porta filter from which machine/outlet is presently being filled and then the grinder machine automatically associates the corresponding flowmeter information and adapts the degree of grinding and the amount of coffee (weight) filled into the porta filter.

According to a further aspect of the present invention it relates to a kit of parts comprising an automatic coffee bean grinder with a grinder control unit with ability of wireless communication as well as a flowmeter sniffer element separate from said automatic coffee bean grinder and having connector elements to physically connect to the output lines or to intercept and/or sniff the data line between a flowmeter and a brewer control unit of a standard coffee brewing machine, a power supply element, preferably in the form of a battery or to be (parasitically) attached to the power supply of said standard coffee brewing machine, and a wireless transmission unit to wirelessly transmit water flow-through information read out from the flowmeter to the grinder control unit.

The present invention furthermore relates to a method of upgrading an existing setup comprising a coffee brewing machine and separate therefrom a coffee bean grinder, comprising the steps of:

attaching a flowmeter sniffer element, separate from said automatic coffee bean grinder directly or indirectly to the output of a flowmeter of said coffee brewing machine, preferably by opening the housing of the coffee brewing machine and attaching the flowmeter sniffer to the output lines of the flowmeter, leaving the flowmeter sniffer element within the coffee brewing machine and closing the housing of the coffee brewing machine, and establishing a wireless communication between said flowmeter sniffer and a grinder control unit of the coffee brewing machine.

Said flowmeter sniffer element may comprise at least connector elements to physically connect to the output lines or to intercept and/or sniff the data line between a flowmeter and a brewer control unit of a standard coffee brewing machine, a power supply element, preferably in the form of a battery or to be (parasitically) attached to the power supply of said standard coffee brewing machine, and a wireless transmission unit to wirelessly transmit water flow-through information read out from the flowmeter to the grinder control unit.

The present invention furthermore relates to a flowmeter sniffer element for use in a method as described above, which flowmeter sniffer element is separate from said automatic coffee bean grinder and having connector elements to physically connect to the output lines or to intercept and/or sniff the data line between a flowmeter and a brewer control unit of a standard coffee brewing machine, a power supply element, preferably in the form of a battery or to be (parasitically) attached to the power supply of said standard coffee brewing machine, and a wireless transmission unit to wirelessly transmit water flow-through information read out from the flowmeter to the grinder control unit.

Also the present invention relates to a use of a flowmeter sniffer element for controlling a coffee bean grinder and being separate from said automatic coffee bean grinder, said flowmeter sniffer element having connector elements to physically connect to the output lines or to intercept and/or sniff the data line between a flowmeter and a brewer control unit of a standard coffee brewing machine, a power supply element, preferably in the form of a battery or to be (parasitically) attached to the power supply of said standard coffee brewing machine, and a wireless transmission unit to wirelessly transmit water flow-through information read out from the flowmeter to the grinder control unit in a method as detailed above.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1 shows a schematic illustration of a coffee brewing machine and a separate coffee bean grinding machine and the communication and control as proposed in this application.

DESCRIPTION OF PREFERRED EMBODIMENTS

FIG. 1 shows the coffee brewing machine 1 and the separate coffee bean grinder 2 being to physically separate machine entities. The coffee brewing machine 1 comprises, in a housing 3, a water tank 4, a flowmeter 5, a pump 6, a water flow-through heater 7, and an interface to a porta filter, which typically is in the form of an attachment by way of a bayonet mechanism. As illustrated by solid lines, there is water flow between the water tank 4 to and through the flowmeter 5, and downstream of the flowmeter 5 the water passes the pump 6 and is then passed through the heater 7. The heater is attached to a corresponding power supply (not illustrated) and heats the water to the desired temperature. Additional valves (not illustrated) are provided to make sure not only the desired temperature but also the desired pressure are reached. Downstream of the water heater 7 the line carries on to the interface 8.

The coffee brewing machine 1 comprises a brewed coffee dispensing area 19, which is typically like a cutout or a recessed portion in the housing 3. That housing can be used to insert the porta filter 9, by holding it on the handle 10, and attaching it to the corresponding interface 8 firmly. Furthermore there is provided a user input/output device 13. Once the porta filter is inserted into the area 19 and attached to the interface 8 the user can start the desired brewing process by interacting with the interface 13. Coffee is then brewed and is flowing into the coffee cup 11, which is located on a corresponding base 12 of the machine 1.

Control in the coffee brewing machine 1 takes place way of a corresponding brewer control unit 14. Data transmission lines are indicated by dashed lines. The control unit 14 is normally provided with a data line to a sensor sensing the level of the water in the water container 4. Furthermore it comprises data line to the flowmeter 5 to receive information on the water flow and to control the brewing process accordingly. Also it has a data line to the pump to control its speed and/or duration of operation. Furthermore there is a data and control line to the heater 8 to adapt and control the heating process. As indicated above, there are typically in addition to the illustrated elements valves and further sensor elements, these are also controlled or used for control by the control unit 14.

The coffee bean grinder 2 also has a separate housing 22. Usually on top of that housing there is provided a coffee bean container 20, which can be opened on the top to be refilled with coffee beans. At the bottom end of that coffee bean container 20, which is typically converging towards the bottom, there is provided the actual grinding mechanism or the grinder module 24, i.e. the actual grinding elements, typically one ring-like stationary and one cone like rotating grinder element, the rotating grinder element being driven by a motor. There is furthermore provided an automatic adjustment mechanism to adjust the rotary speed of the motor, if need be the torque of the motor, and the width of the slot between the two grinder elements to adjust the resulting grain size. Control in that coffee bean grinder 2 is coordinated and carried out by a grinder control unit 26. The corresponding data lines are illustrated by dashed lines. Also the grinder typically comprises an input/output device for the user (not illustrated) which communicates with the grinder control unit 26 or which is integral with the grinder control unit. Furthermore the coffee bean grinder 2, in a separate foot portion 23, may comprise a load cell 25 for measuring the weight of the coffee which has been dispensed to a porta filter inserted into the ground coffee dispensing area and put onto a corresponding holder cooperating with the foot portion/load cell. Also this load cell 25 is in data connection with the grinder control unit 26, the grinder control unit 26 receiving information about the effective weight of the ground coffee filled into the porta filter.

According to a first aspect of the invention in the coffee brewing machine there is provided a flowmeter sniffer 15 in the housing 3 of the coffee brewing machine and attached by way of a data line 16 directly to the flowmeter. The flowmeter sniffer 15 comprises either a small battery or is attached to the power supply in the coffee brewing machine 1. It is provided with a small CPU and storage means and interface means able to receive the water flow information from the flowmeter via line 16, if need be to timestamp the corresponding information, and to then transmitted by way of a wireless communication, for example Bluetooth, to the coffee bean grinder machine 2, or more specifically, to the grinder control unit 26, which itself is provided with means for wireless communication with the flowmeter sniffer.

Typically the signal emitted by the flowmeter 5 is a train of individual pulses the spacing of which is time-dependent, which pulses are generated by the rotary wheel in the flowmeter. A possible flowmeter is for example the espresso flowmeter Gicar ¼" Standard Flowmeter as available from Gicar. This train of impulses is then either without further processing transmitted to the grinder control unit, or it is first time stamped, i.e. each impulse is attributed a real-time data element, and then the data are transmitted. The latter procedure using time stamping avoids distortion of the results due to collisions or other delays in the wireless transmission between the flowmeter sniffer 15 and the grinder control unit 26.

In a first embodiment the flowmeter sniffer detects each impulse coming from the flowmeter and sends for each impulse a digital signal to the grinder. The grinder then adds to every incoming signal a relative or absolute timestamp for further calculation and control.

According to a preferred embodiment, the flowmeter sniffer detects each impulse coming from the flowmeter and adds a relative timestamp to each impulse. This relative timestamp can be e.g. the microseconds after starting the flowmeter sniffer. Each impulse from the flowmeter (i.e. the so-called "ticks") are sent together with the corresponding timestamp to the grinder. In this scenario latencies which are unavoidable in case of wireless trans-missions can be neglected and the precision of further calculation and control increases, as opposed to the situation where the flowmeter sniffer sends only a signal for each tick without a timestamp.

Absolute timestamps (e.g. Unix timestamps) are an ideal option if the grinder is connected to telemetric services: In this case any operator with access to these telemetric data has an overview about statistics, coming only from the grinder and not from the coffee machine. This is a special advantage if e.g. a coffeehouse chain is using expensive espresso machines with no telemetric options available: Only by using a grinder according to this invention he has a complete overview what is going on in his coffee houses without replacing the espresso machines.

The grinder is thus enabled to continuously monitor and calculate the status of the coffee machine and to control the needed parameters (i.e. fineness of ground coffee and/or the amount of ground coffee) for a constant brewing process only on the basis of some few presets and the incoming ticks/timestamps from the flowmeter sniffer. The presets are mainly related to the desired extraction time and its upper or lower allowed deviation where a correction controlled by the grinder should start, the desired amount of water for the chosen recipe by the coffee machine and its thresholds for adjustment and/or the desired flowrate profile. In addition, these presets can be allocated to a memory structure, e.g. a recipe, to switch in a very simple way between different brewing processes resulting from another drink brewed by the coffee machine. Switching between different presets can be done in a manual way by the user on the grinder itself or in an automatic way by the coffee machine without user intervention by sending additional information about the status of the current recipe (or a change of recipe) to the grinder.

The true information content of the data provided by the flowmeter sniffer depends on the type of the flowmeter in the coffee brewing machine. Upon installation of the flowmeter sniffer advantageously therefore the operator examines the flowmeter and identifies its type, and this information is programmed into the grinder control so the grinder knows which amount of water is e.g. associated with each tick of the flowmeter. Furthermore it can be advantageous if in the memory of the grinder there is provided a look-up table of the most common flowmeters in coffee brewing machines, so that the operator upon installation can just input a identification information of the flowmeter and the grinder then looks that up and knows, what this means in terms of data received by the flowmeter sniffer (one tick means xx ml of water etc.). Also possible is the automatic detection and identification of the flowmeter by the grinder by way of the type of ticks etc. transmitted by the flowmeter sniffer.

The same is possible by using the information of model of the coffee brewing machine if this information is reliably associated with a particular type of flowmeter. If the information of model of the coffee brewing machine is given to the grinder, this may further be used for having pre-knowledge on extraction profiles of the type of machine etc. Because the starting point of the brewing process is not necessarily sent from the coffee brewing machine to the grinder, the grinder has to detect this starting point from the permanent incoming data sent by the flowmeter sniffer: In a very simple way it can be the occurrence of one or more ticks in between a pre-defined time interval.

The same relates to the end point of the brewing process: After the starting point of the brewing process has been detected the end point can be detected by a pre-defined timeout for one or more ticks.

In another embodiment the flowmeter sniffer can send special events in case the flowmeter sniffer itself detects a timeout of ticks (in case no water is running through the flowmeter) so that the grinder has a permanent non-timeout connection with the flowmeter sniffer.

Between the detected starting point and end point of the brewing process the grinder can easily determine the brewing process parameters, e.g. used amount of water for this shot, the extraction time and also the flowrate profile. The used amount of water is the total of ticks during the brewing process multiplied by the volume of each tick of the flowmeter. The extraction time is end time minus starting time. The flowrate profile can be rated by a simple linear curve (e.g. balance line) through the collected ticks or by a more sophisticated curve fitting, done e.g. by interpolation, extrapolation, smoothing, regression analysis or digital filter.

Having calculated one or more of these brewing process parameters the grinder can adjust in an autonomous way with no additional information coming from the coffee machine the grinding discs adjustment (i.e. the distance between the rotating and fixed blade) and/or the amount of ground coffee e.g. by corresponding timing of the grinding.

In the simplest case the grinder only adjusts the grinding blades space on the basis of one brewing process parameter, e.g. the extraction time: If the pre-defined "ideal" extraction time given to the grinder (e.g. 25 seconds) falls below a pre-defined value (e.g. 24 seconds) or threshold (in this case one second) resulting from analysis of the ticks of the last shot the grinder will automatically increase the grinding fineness of the ground coffee by reducing the space between the grinding blades or grinding discs and vice versa. In this embodiment it is important that the grinder constantly grinds the same amount of coffee which is controlled either by time, by weight or a combination of time and weight.

But is also possible to analyze only the amount of water used for each shot: If the pre-defined "ideal" water amount given to the grinder (e.g. 40 ml) is exceeded by an pre-defined value (e.g. 42 ml) resulting from analysis of the integral of the ticks of the last shot the grinder will automatically increase the coarseness of the ground coffee by increasing the space between the grinding blades or grinding discs and vice versa.

In another aspect of the invention the space between the grinding blades (or the grinding discs) is kept constant: If the extraction time is exceeded the amount of ground coffee is decreased and vice versa.

In a further embodiment the coarseness of the ground coffee, as well as its dosage (weight) are controlled by the grinder: In this case at least two brewing process parameters are necessary. For example, the extraction time, as well as if needed also the amount of water, are the analyzed data for each shot: If the amount of water and the extraction time are both too high the amount of ground coffee has to be increased and the coarseness of the ground coffee has also to be increased. If in another case the extraction time is too high and the amount of water is to low, the amount of ground coffee has to be decreased and the coarseness of the ground coffee has to be increased.

If the flowrate profile is a parameter for analysis of the brewing process and the grinder has control over the grinding blades distance and/or dosage of ground coffee, a very simple method for control is the rise of the flowrate in the first seconds of the brewing process: If this rise is not steep enough and the amount of water and/or the extraction time are in between the pre-defined values the coarseness of the coffee should be decreased and the amount of ground coffee should be increased.

The great advantage of all embodiments of this invention is that the barista has only to focus on the grinder and not on the coffee machine: In daily business the barista's main recipe is a double espresso: He defines once in the permanent memory of the grinder the ideal extraction time, the ideal amount of used water and/or the ideal flowrate profile and the parameters to control (i.e. the grinding blades distance and/or the amount of ground coffee) for the perfect taste in his double espresso cups by using an App or the GUI of the grinder. The rest is done by the grinder autonomously.

In another case, especially if this complex brewing process has to performed by a non-well-trained user, the coffee machine sends additional information to the grinder to take control over the recipe (i.e. presets and grinding parameters) but not over the grinder. In this case the coffee machine sends to the grinder all parameters needed for controlling the brewing process by the grinder, e.g. ideal extraction time, the ideal amount of used water and/or the ideal flowrate profile and the parameters to control but not the grinding discs adjustment. If a wireless transmission between coffee machine and grinder is preferred the flowmeter sniffer as well as the coffee machine could use two separate senders, the grinder can have only one receiver if the protocol is e.g. Bluetooth.

According to an alternative realization, the coffee brewing machine can be provided with a dedicated interface to attach a corresponding flowmeter sniffer 15'. The interface can be provided by way of a data line 17 to a socket 18 in the housing 3, the socket can for example be a USB interface. In this case the flowmeter sniffer 15' can be a small USB dongle which picks up the flowmeter information indirectly transmitted from the flowmeter 5 via the brewer control unit 14 to the interface 18, and then wirelessly transmits it to the grinder control unit 26.

| List of Reference Signs | |
|---|---|
| 1 | coffee brewing machine |
| 2 | coffee bean grinder |
| 3 | housing of 1 |
| 4 | water tank |
| 5 | flowmeter |
| 6 | water pump |
| 7 | water flow-through heater |
| 8 | interface to porta filter |
| 9 | porta filter |
| 10 | handle of 9 |
| 11 | cup |
| 12 | base for cup |
| 13 | user input output device |
| 14 | brewer control unit |
| 15 | flowmeter sniffer |
| 15' | alternative flowmeter sniffer |
| 16 | data line between 5 and 15 |
| 17 | data line for sniffer interface |
| 18 | socket for 15' |
| 19 | brewed coffee dispensing area |
| 20 | coffee bean container |
| 21 | ground coffee dispensing area |
| 22 | housing of 2 |
| 23 | separate foot portion of 2 |
| 24 | grinder module |
| 25 | load cell |
| 26 | grinder control unit |
| solid lines | water piping |
| dashed lines | data/signal lines |

The invention claimed is:

1. A method for controlling an automatic coffee bean grinder, which is separate from an automatic coffee brewing machine using ground coffee produced by said coffee bean grinder, wherein a flowmeter sniffer element is located in or at a housing of said coffee brewing machine, comprising:

capturing the water flow-through information measured by the water flowmeter of said coffee brewing machine,
transmitting the water flow-through information to a grinder control unit located in the automatic coffee bean grinder, and
controlling by the grinder control unit the automatic coffee bean grinder as a function of the water flow-through information transmitted from said flowmeter sniffer element.

2. The method according to claim 1, wherein the flowmeter sniffer element transmits the water flow-through information by way of wireless communication to the grinder control unit.

3. The method according to claim 1, wherein the water flow-through information is a train of impulses as a function of time, the occurrence and/or spacing of which impulses is a function of or allows the determination of the total brewing time, the total brewing water amount, the water flow as a function of time, or a combination thereof, or is directly information on at least one of the total brewing time or the total brewing water amount or the water flow as a function of time.

4. The method according to claim 3, wherein the impulses obtained by the flowmeter sniffer element from the flowmeter are time-stamped and then transmitted with the time-stamp as water flow-through information to the grinder control unit .

5. The method according to claim 1, wherein the water flow-through information received by the grinder control unit from that flowmeter sniffer element is used by the grinder control unit to adapt the grinder module operation in terms of grain size, grinding duration per portion, total weight of ground coffee per portion, or a combination thereof.

6. The method according to claim 1,
wherein the coffee bean grinder further comprises or is connected to a load cell which measures the effective weight of the ground coffee per portion, said load cell being in data communication with the grinder control unit, and
wherein the method involves adapting controlling the grinder module to produce a predetermined effective weight of ground coffee proportion as a function of input obtained from said load cell as well as from the flowmeter sniffer element .

7. The method according to claim 1, wherein the coffee brewing machine comprises at least one water tank, at least one water pump to pump water from the water tank to an interface to a porta filter, at least one heater, to heat the water to a predetermined temperature, as well as at least one flowmeter, to measure the water flow-through information of pumped water from the water tank, a brewer control unit controlling pump and/or heater as a function of said water flow-through information.

8. The method according to claim 1, wherein the flowmeter sniffer element is a separate unit having connector elements to physically connect to the output lines or to intercept and/or sniff the data line between the flowmeter and a brewer control unit, a power supply element, and a wireless transmission unit to wirelessly transmit water flow-through information read out from the flowmeter to the grinder control unit.

9. The method according to claim 8, wherein said flowmeter sniffer element is inserted into the housing of the coffee brewing machine only upon installation of the coffee bean grinder for cooperation and control of the coffee bean grinder.

10. The method according to claim 8,
wherein the coffee brewing machine is provided with an interface for a flowmeter sniffer element, said interface being located at the outside of the housing or integrated in the housing of the coffee brewing machine and being provided by the brewer control unit with water flow-through information from the flowmeter, and
wherein said flowmeter sniffer element is attached to said interface of the coffee brewing machine only upon installation of the coffee bean grinder for cooperation and control of the coffee bean grinder.

11. A kit of parts comprising:
an automatic coffee bean grinder with a grinder control unit having an ability of wireless communication;
a flowmeter sniffer element separate from said automatic coffee bean grinder and having connector elements to physically connect to output lines or to intercept and/or sniff a data line between a flowmeter and a brewer control unit of a standard coffee brewing machine;
a power supply element; and
a wireless transmission unit to wirelessly transmit water flow-through information read out from the flowmeter to the grinder control unit.

12. A method of upgrading an existing setup comprising a coffee brewing machine and separate therefrom a coffee bean grinder , comprising the steps of:
attaching a flowmeter sniffer element, separate from said automatic coffee bean grinder, to the output of a flowmeter of said coffee brewing machine, by attaching the flowmeter sniffer to output lines of the flowmeter, leaving the flowmeter sniffer element within the coffee brewing machine, and
establishing a wireless communication between said flowmeter sniffer and a grinder control unit of the coffee brewing machine.

13. The method according to claim 12, wherein said flowmeter sniffer element comprises at least:
connector elements to physically connect to the output lines or to intercept and/or sniff the data line between a flowmeter and a brewer control unit of a standard coffee brewing machine,
a power supply element, and
a wireless transmission unit to wirelessly transmit water flow-through information read out from the flowmeter to the grinder control unit .

14. A flowmeter sniffer element for use in a method according to claim 1, which flowmeter sniffer element is separate from said automatic coffee bean grinder and having:
connector elements to physically connect to the output lines or to intercept and/or sniff the data line between a flowmeter and a brewer control unit of a standard coffee brewing machine,
a power supply element, and
a wireless transmission unit to wirelessly transmit water flow-through information read out from the flowmeter to the grinder control unit.

15. A method of using a flowmeter sniffer element for controlling a coffee bean grinder and being separate from said automatic coffee bean grinder, said flowmeter sniffer element having:
connector elements to physically connect to the output lines or to intercept and/or sniff the data line between a flowmeter and a brewer control unit of a standard coffee brewing machine,
a power supply element, and a wireless transmission unit to wirelessly transmit water flow-through information read out from the flowmeter to the grinder control unit using a method according to claim 1.

16. The method according to claim 1, wherein the flowmeter sniffer element transmits the water flow-through information by way of wireless communication to the grinder control unit, by way of one of the standards selected from: Bluetooth, BLE, ZigBee, Z-wave, 6LoWPAN, Thread, LoRaWAN, 2G, 3G, 4G, 5G, LTE, NFC.

17. The method according to claim 1, wherein the coffee brewing machine comprises at least one water tank, at least one water pump to pump water from the water tank to an interface to a porta filter, at least one heater, located downstream of said pump, to heat the water to a predetermined temperature, as well as at least one flowmeter, located upstream of said pump to measure the water flow-through information of pumped water from the water tank, a brewer control unit controlling pump and/or heater as a function of said water flow-through information, as well as at least one user interface to allow for user input, including brewing profile selection, and/or for user output, including status and operational information display.

18. The method according to claim 1, wherein the flowmeter sniffer element is a separate unit having connector elements to physically connect to the output lines or to intercept and/or sniff the data line between the flowmeter and a brewer control unit, a power supply element, in the form of a battery or to be directly or parasitically attached to the power supply of said coffee brewing machine, and a wireless transmission unit to wirelessly transmit water flow-through information read out from the flowmeter to the grinder control unit.

19. The method according to claim 8, wherein said flowmeter sniffer element being part of the coffee bean grinder product package is inserted into the housing of the coffee brewing machine only upon installation of the coffee bean grinder for cooperation and control of the coffee bean grinder.

20. The method according to claim 8, wherein the coffee brewing machine is provided with an interface for a flowmeter sniffer element, said interface being located at the outside of the housing or integrated in the housing of the coffee brewing machine and being provided by the brewer control unit with water flow-through information from the flowmeter, and wherein said flowmeter sniffer element, being part of the coffee bean grinder product package, is attached to said interface of the coffee brewing machine only upon installation of the coffee bean grinder for cooperation and control of the coffee bean grinder.

21. The kit of parts according to claim 11, comprising
a flowmeter sniffer element separate from said automatic coffee bean grinder and having:
connector elements to physically connect to the output lines or to intercept and/or sniff the data line between a flowmeter and a brewer control unit of a standard coffee brewing machine,
a power supply element, in the form of a battery or to be directly or parasitically attached to the power supply of said standard coffee brewing machine, and
a wireless transmission unit to wirelessly transmit water flow-through information read out from the flowmeter to the grinder control unit.

22. A method of upgrading an existing setup comprising a coffee brewing machine and separate therefrom a coffee bean grinder according to claim 12, comprising the steps of:
attaching a flowmeter sniffer element, separate from said automatic coffee bean grinder to the output of a flowmeter of said coffee brewing machine, by opening the housing of the coffee brewing machine and attaching the flowmeter sniffer to the output lines of the flowmeter, leaving the flowmeter sniffer element within the coffee brewing machine and closing the housing of the coffee brewing machine, and
establishing a wireless communication between said flowmeter sniffer and a grinder control unit of the coffee brewing machine.

23. The method according to claim 12, wherein said flowmeter sniffer element and comprises at least:
connector elements to physically connect to the output lines or to intercept and/or sniff the data line between a flowmeter and a brewer control unit of a standard coffee brewing machine,
a power supply element, in the form of a battery or to be directly or parasitically attached to the power supply of said standard coffee brewing machine, and
a wireless transmission unit to wirelessly transmit water flow-through information read out from the flowmeter to the grinder control unit.

24. The flowmeter sniffer element according to claim 14 having:
a power supply element, in the form of a battery or to be directly or parasitically attached to the power supply of said standard coffee brewing machine, and
a wireless transmission unit to wirelessly transmit water flow-through information read out from the flowmeter to the grinder control unit.

25. The method of using a flowmeter sniffer element according to claim 15, said flowmeter sniffer element having:
connector elements to physically connect to the output lines or to intercept and/or sniff the data line between a flowmeter and a brewer control unit of a standard coffee brewing machine,
a power supply element, in the form of a battery or to be directly o parasitically attached to the power supply of said standard coffee brewing machine, and
a wireless transmission unit to wirelessly transmit water flow-through information read out from the flowmeter to the grinder control unit.

\* \* \* \* \*